Nov. 23, 1965     H. D. BAUMANN     3,219,310

PRESSURE BALANCED VALVE HAVING YIELDABLE SEATING

Filed Dec. 14, 1962

HANS D. BAUMANN
*INVENTOR.*

BY *Daniel A. Bobis*
*Atty*

United States Patent Office 3,219,310
Patented Nov. 23, 1965

1

3,219,310
PRESSURE BALANCED VALVE HAVING
YIELDABLE SEATING
Hans D. Baumann, Sharon, Mass., assignor to Worthington Corporation, Harrison, N.J., a corporation of Delaware
Filed Dec. 14, 1962, Ser. No. 244,744
4 Claims. (Cl. 251—61)

This invention relates generally to valves. More particularly the invention relates to valves operated by integral components. Still more particularly the invention relates to valves operated by integral components within the valve housing outside of the valve flow channel.

Heretofore valve structures required such components as stems, stuffing boxes, radiating fins, stem seals, bonnets, yokes, etc., which components were located inside and outside the valve housing. Aside from the usual sealing and wear problems, for certain applications, such as valves used for cryogenic service, these prior art valves were especially unsatisfactory.

An object of the present invention is to overcome the prior art disadvantages by providing an improved valve which eliminates many of the components which cause the sealing, wear and freezing problems; which has an operator integrally formed therein; which can be opened or closed responsive to a signal from an outside source; which has a sealed flow channel therein; which may be designed to be normally closed; which has a simple, compact, rugged, reliable and efficient design.

Another object of the present invention is to provide an improved valve which utilizes components which are self aligning; which may readily be assembled and disassembled; which may be operated by fluid pressure, which reduces radiation heat loss.

Other objects and advantages will be apparent from the following description of the invention and the novel features will be particularly pointed out hereinafter in the claims.

Figure 1:
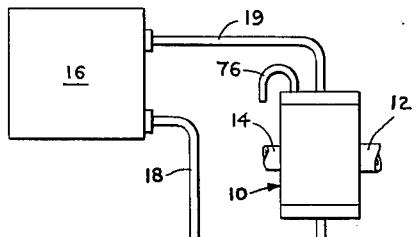
FIGURE 1 is a view of the improved valve connected to a typical fluid controller.

In the embodiment of the invention illustrated in FIGURES 1 to 5 the improved valve 10 is shown in FIGURE 1 having an inlet line 12 and an outlet line 14 and is suitably connected to a fluid controller 16 by means of signal line 18 and balancing line 19, the purpose of which is more fully described hereinafter. Since fluid controller 16 is well known in the art and does not form a part of the present invention, it need not be described other than to say it may comprise any typical fluid controller readily available on the market. For purposes of convenience the fluid controller 16 will be considered to be a pneumatic controller since in this illustration of the invention the valve 10 will be considered for operation in cryogenic service. It is understood that the invention can be used for any type service where atmospheric or ambient inleakage is undesirable and dependent on the type service any appropriate corresponding fluid controller may be selected.

Figure 3:
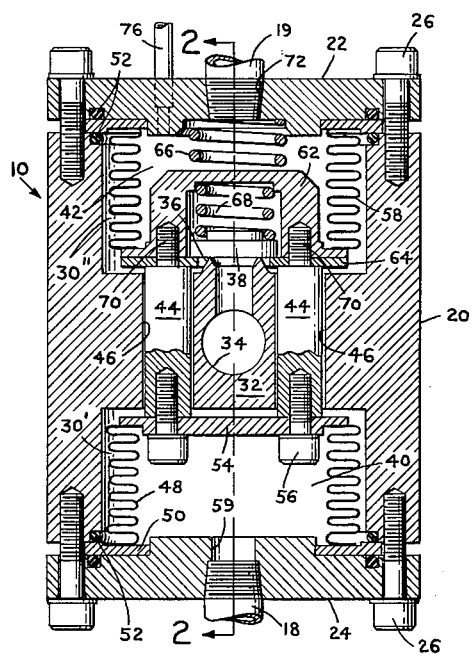
FIGURE 3 is a view taken along line 3—3 of FIGURE 2.
Figure 2:
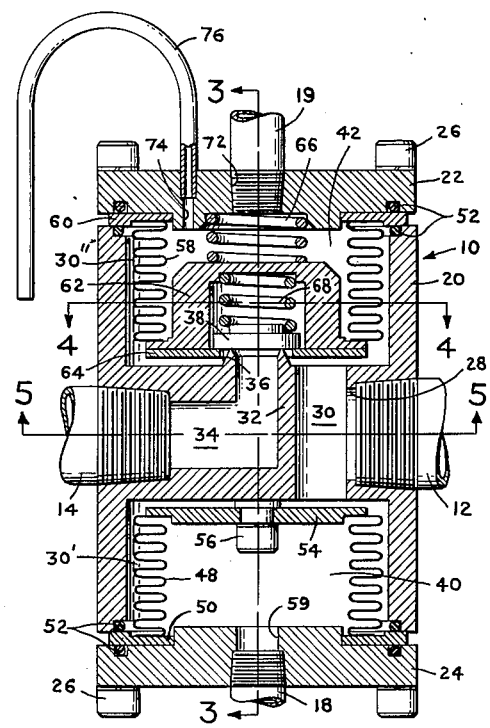
FIGURE 2 is a view taken along line 2—2 of FIGURE 3.

The valve 10 as illustrated in FIGURES 2 and 3 has a housing 20 to which an upper cap 22 and a lower cap 24 are suitably connected as by threaded members 26. Inlet line 12 is threadedly connected to inlet port 28 and, assuming cryogenic service, delivers liquefied gas from a suitable source (not shown) through port 28 into flow passage 30 which is formed on the inner side of housing 20. Flow passage 30 has a lower portion 30′ and an upper portion 30″ in communication therewith. To prevent the straight through flow of the liquefied gas a transverse partition 32 is integrally formed in housing 20. Transverse partition 32 has an outlet port 34 formed therein which communicates with outlet line 14 connected thereto. Adjacent the upper end of port 34 on the outer side of transverse partition 32 is formed a conical surface tip 36. The uppermost part of port 34 defines a horizontal plane upon which seat 38 is adapted to engage thus closing port 34 and preventing the flow of liquefied gas therethrough. Seat 38 is larger in size than port 34 so that its edges overlap port 34 and tip 36.

Figure 5:
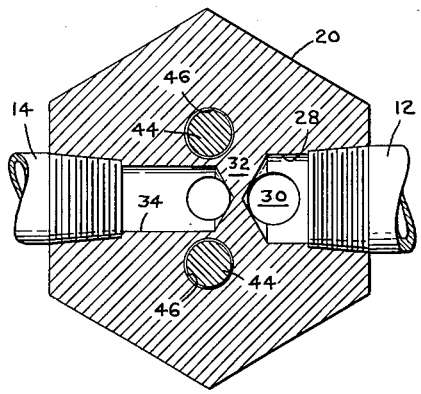
FIGURE 5 is a view taken along line 5—5 of FIGURE 2.

In place of the usual valve actuating components such as the stem, stuffing box, etc. the improved valve uses an integral operator including signal chamber 40 and balancing chamber 42 operatively connected in spaced relationship to each other by posts 44 extending through holes 46 as shown in FIGURES 2, 3 and 5.

Signal chamber 40 is formed in the flow passage lower portion 30′ by means of lower bellows 48 being connected at the lower end thereof to annular plate 50 which is sealed by O-rings 52 into assembled position between housing 20 and lower cap 24. The upper end of lower bellows 48 is connected to a movable plate 54 which has threaded members 56 extending therethrough to fixedly engage posts 44. Lower cap 24 has passage 59 formed therein to which signal line 18 is connected whereby a signal from controller 16 can be sent to signal chamber 40 which is sealed from lower portion 30′. This will cause chamber 40 to expand as more fully described hereinafter.

Figure 4:
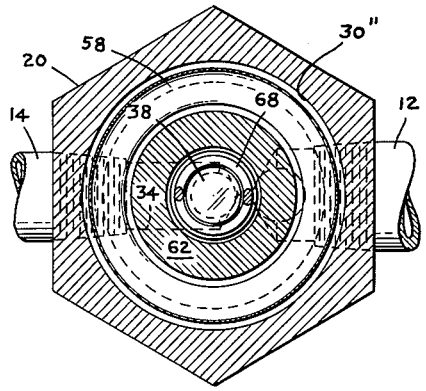
FIGURE 4 is a view taken along line 4—4 of FIGURE 2.

Balancing chamber 42 as shown in FIGURES 2, 3 and 4 is disposed in the flow passage upper portion 30″ and is formed by means of upper bellows 58 which is connected at its upper end to an annular plate 60 disposed in sealed relationship by O-rings 52 between housing 20 and upper cap 22. The lower end of upper bellows 58 is suitably connected to an inverted cup-shaped member 62 which has a seat moving member 64 connected to the bottom thereof, which member 64 extends under the overlapping edges of seat 38, for purposes more fully described hereinafter.

Outer spring 66 is disposed between upper cap 22 and the upper end of inverted cup-shaped member 62 to normally urge member 62 away from upper cap 22. On the other side of member 62 an inner spring 68 is disposed between member 62 and seat 38 to normally urge seat 38 into engagement with the upper end of port 34 to prevent the flow of liquified gas from flow passage 30 therethrough. Thus, seat 38 is of the freely floating type, that is it is yieldably supported relative to cup-shaped member 62. Posts 44 have threaded ends 70 which extend through plate 64 into engagement with member 62 to secure the seat moving means and the balancing chamber 42 and signal chamber 40 into operative assembly. Upper cap 22 has a passage 72 formed therein to which balancing line 19 is connected. Also in upper cap 22 there is formed a capillary passage 74 which has a capillary tube 76 disposed therein.

The liquefied gas at a certain pressure in flow passage 30 will also fill the upper portion 30″ and lower portion 30′ thereof. The effective areas of lower bellows 48 and upper bellows 58 and the plates 54 and 64, respectively, are the same so that the effective fluid pressure acting on each will cancel the other out thus balancing the resultant forces generated by the pressure of the liquefied gas acting thereon. On a control signal being fed through line 18 and passage 59 into signal chamber 40 lower bellows 48 will expand and overcome the force of outer sping 66 thus forcing balancing chamber 42 to contract. Seat moving member 64 being disposed beneath the overlapped edges of seat 34 will, on balancing chamber 42 being forced to move upward, likewise rise and unseat seat 38 from port 34 thus opening flow passage 30 to the outlet port 34 and outlet line 14 thereby allowing liquefied gas to flow therethrough. The amount of lift of seat 38 can be effectively determined by either the signal from controller 16 or by the characteristics of the spring 66 or by both.

When it is desired to close outlet port 34 the signal pressure to signal chamber 40 is reduced and controller 16 will supply balancing line 19 with balancing pressure into balancing chamber 42 thereby overcoming and expanding balancing chamber 42 back to its original position. Capillary tube 76 serves to entrap the lighter operating gas from controller 16 in the upper bellows 58 and prevents a moist ambient air from entering balancing chamber 42. Of course it would be possible to use a bleed (not shown) to continually purge chamber 42 with the media supplied through line 19.

In the improved valve 10, the movable components may move unrestricted as to alignment. Hence they may be said to be self-aligning and therefore assembly and disassembly of the valve 10 is greatly facilitated.

It will be understood that various changes in details, materials and arrangement of parts which have been herein described and illustrated in order to explain the nature of the invention may be made by those skilled in the art within the principle and scope of the invention as expressed in the claims.

What is claimed is:

1. A valve for controlling the flow of pressure fluids therethrough comprising in combination, a housing having a flow passage formed therein, inlet means in fluid flow communication with said flow passage for the introduction of pressure fluid thereto, expandable chamber means in said flow passage in fluid flow communication with said inlet means, said expandable chamber means being adapted to be connected to controller means to control the expansion thereof and comprising oppositely oriented signal and balancing portions, respectively, of substantially equal outward areas whereby the forces exerted thereon by said pressure fluid within said flow passage will be substantially equal and balanced, partition means extending across said flow passage and including port means formed therein in fluid flow communication with said flow passage, said port means having valve seat means formed thereon, outlet means in fluid flow communication with said port means for the flow of pressure fluid from said housing, valve means of the freely floating type cooperatively associated with said port means and movable relative to said valve seat means to prevent or permit fluid flow between said port means and said flow passage, valve operating means cooperatively associated with said valve means and one of said expandable chamber portions and operable to move said valve means relative to said valve seat means, said signal and balancing portions being disposed to opposite sides of said partition means, and connecting means extending through said partition means, with clearance therebetween, at locations offset from said port means, for connecting said signal and balancing portions to transmit motion therebetween whereby, pressure fluid introduced to said flow passage through said inlet means will exert substantially equal and oppositely directed forces on said expandable chamber portions and said valve means may be moved relative to said valve seat means through the action of said controller means.

2. In a valve as claim 1 wherein, said valve operating means comprise a member carried by one of said chamber portions, said member including a chamber formed therein, said valve means being disposed within said member chamber, and biasing means disposed within said member chamber and operable to bias said valve means toward said valve seat means.

3. In a valve as in claim 1 wherein, said valve seat means terminate in a substantially knife edge-like portion with said valve means being movable into surface contact with said valve seat means portion to prevent fluid flow communication between said port means and said flow passage and provide for minimum surface area contact between said respective valve and valve seat means.

4. In a valve as in claim 1 wherein, the flow area of said port means is less than the flow areas of either of said inlet or outlet means.

References Cited by the Examiner

UNITED STATES PATENTS

| 430,089 | 6/1890 | Sewall | 251—31 X |
| 1,927,259 | 9/1933 | Dougherty | 251—88 |
| 2,311,110 | 2/1943 | Johnson | 251—85 X |
| 2,340,489 | 2/1944 | Pontius et al. | 251—31 X |
| 2,506,724 | 5/1950 | Lindgren | 251—61 X |
| 2,786,487 | 3/1957 | Spence | 251—85 X |

FOREIGN PATENTS 1,212,141  2/1960  France.

ISADOR WEIL, *Primary Examiner.*